Dec. 9, 1952 — L. E. ROUX — 2,620,661

MAGNETIC GAUGE

Filed Sept. 22, 1947

INVENTOR.
LORNE E. ROUX
BY
M. A. Hayes
ATT'Y.

Patented Dec. 9, 1952

2,620,661

UNITED STATES PATENT OFFICE 2,620,661

MAGNETIC GAUGE

Lorne E. Roux, United States Navy, Brockton, Mass.

Application September 22, 1947, Serial No. 775,511

11 Claims. (Cl. 73—313)

(Granted under the act of March 3, 1883, as amended April 30, 1928; 370 O. G. 757)

This invention relates in general to a magnetic gauge in which a movable permanent magnet magnetically attracts and correspondingly moves a magnetic follower. The invention is more particularly described as a visible pressure indicator, as an electrical instrument pressure indicator, and as a tank level electrical indicator.

An important object of the invention is to provide a magnetic gauge construction in which a movable magnetic member confined or enclosed in a non-magnetic casing imparts movement to a relatively free and outside follower by reason of the magnetic lines of force.

A further object of the invention is to provide a relatively simple gauge which is inexpensive, simple to install and service, and not liable to get out of order.

Other objects of the invention will appear in the specification and will be apparent from the accompanying drawing, in which, Fig. 1 is a sectional view of a magnetic pressure gauge in accordance with this invention;

The ordinary gauges now in use are complicated in construction, difficult to maintain and overhaul, and apparently do not function too well or too accurately. As a result they are expensive in first cost, to repair, and to replace; and their operation is unsatisfactory both as to accuracy and reliability. The present invention provides an improved compact construction, which is sturdy and has few moving parts, requires very little repair or replacement, and the cost of installation and maintenance is at a minimum.

Figure 2:
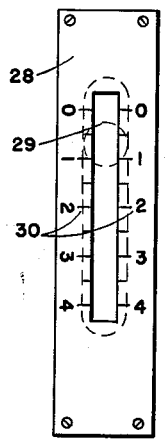
Fig. 2 is view of the face plate shown in Fig. 1.
Figure 1:
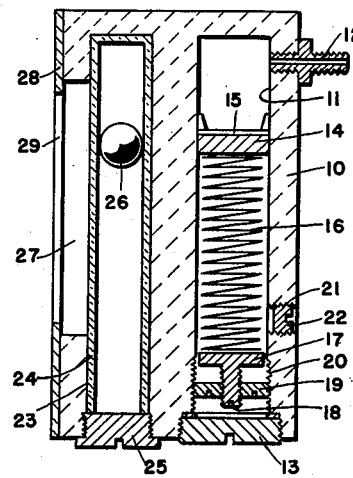

Referring now more particularly to the drawings, a fluid pressure gauge is shown in Fig. 1, comprising a block 10 of aluminum or some other non-magnetic material. In one side of the block is a bore 11 closed at one end, having a pressure inlet stem 12 adjacent the closed end and a cap 13 threaded into the other end.

Within the bore 10 is a piston 14 of hard steel or other material, permanently magnetized. At one side of the piston is a seal 15 of rubber, leather, or other suitable material depending upon the type of fluid. At the other side of the piston is a spring 16 to return the piston in the bore, one end of the spring bearing against the piston 14 and the other end bearing against a calibration piston 17 adjustable in the bore by means of a threaded stem 18 which extends through a plate 19 movable on internal threads 20 at the end of the bore.

Near the calibration end is a threaded drain opening 21 with a plug 22 insertable therein. Any seepage of liquid past the piston may be discharged from the opening and the condition of the seal may also be observed.

Another bore 23 in the block is parallel to bore 11 and is adapted to receive a transparent tube 24 of plastic and the like which is non-magnetic. At one end of the block is a cap 25 threaded into the end of the bore 23 and against the end of the tube holding it tightly in place.

Within the tube 24 is a magnetic follower 26 which slides or moves freely in the tube. If the tube is circular this follower may be spherical, but it is not necessarily so. It may be of any shape not liable to stick in the tube, and also visible from the outside of the tube through a slot 27 in the block 10 extending to the bore 23 in which the tube is contained.

At the outside of the block extending over slot 27 is a face plate 28 with a slot 29 registering with the slot 27 so that the follower 26 may be clearly observed therethrough. At the edge or edges of the slot 29 are calibrated graduations 30 indicating the position of the follower as determined by the adjustment of calibration piston 17 in bore 11.

When pressure is admitted to bore 11 through the stem 12 the magnetized piston 14 is pressed against spring 16. Magnetic follower 26 is moved in tube 24 in accordance with the position of piston 14, the follower may be observed through face plate 28 and the pressure or relative position determined by graduations 30.

Figure 3:
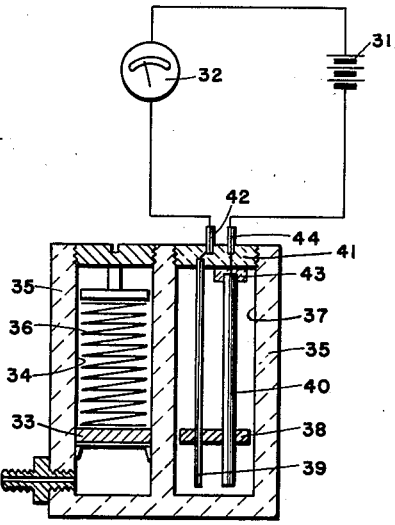
Fig. 3 is a sectional and diagrammatic view of a magnetic electro-pressure gauge transmitter.

A similar pressure device is shown in Fig. 3, connected with an electrical resistance in circuit with a battery 31 or other source of power, and an electro-responsive indicator 32. In this device a magnetized piston 33 is movable in a bore 34 in a non-magnetic block 35 against a spring 36. In a parallel bore 37 is a magnetic follower 38 movable on an electrical conductor rod 39 and slidably engaging an electrical resistance 40.

Conductor rod 39 is mounted on an end cap 41 and electrically connected to a terminal contact 42. Electrical resistance 40 is mounted at one end on an insulating block 43 which is secured to cap 41, and the resistance has an electrical connection with a terminal contact 44. Contacts 42 and 44 are connected in series with the battery 31 and indicator 32.

When pressure is applied to bore 34, piston 33 is moved against spring 36, and magnetic follower 38 is also moved with piston 33 due to its attraction as a magnet. This causes more or less of the resistance 40 to be included in the circuit of the indicator 32 which is graduated to read the pressure applied to piston 33.

Figure 4:
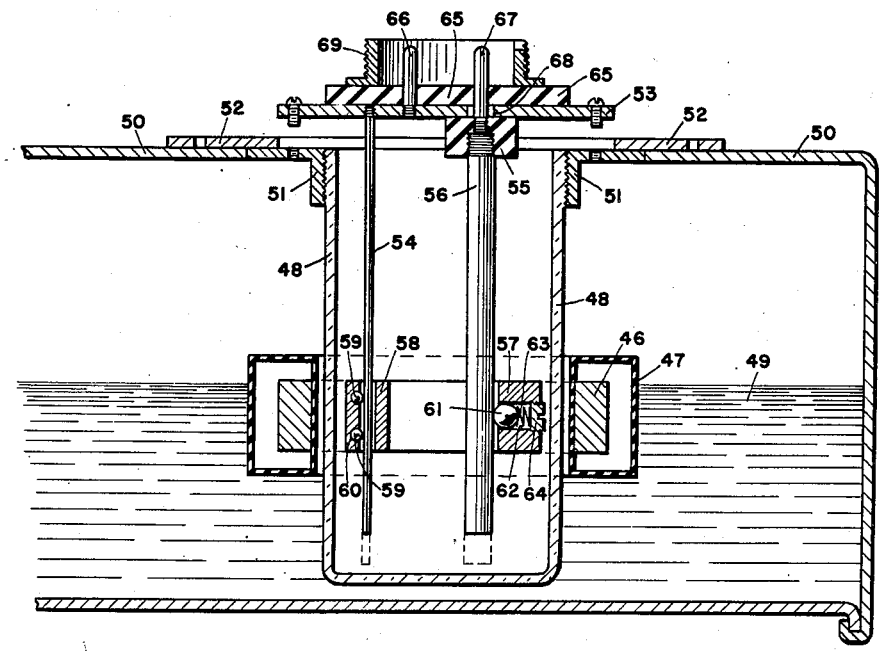
Fig. 4 is a fragmentary sectional view of a magnetic liquidometer.

Another magnetic gauge is shown in Fig. 4, which comprises a liquid level indicator adapted to be inserted in the top or bottom of a tank to show the height of liquid therein.

A permanent magnet 46 is enclosed within a hollow float ring 47 preferably made of thin sheet non-magnetic metal. The ring surrounds a tube 48 closed at the bottom and also of non-magnetic material, adapted to be inserted into a tank 50 for containing liquid 49 in which ring 47 floats.

At the top of tube 48 is a threaded collar 51 and an attached ring 52, or some similar means, for securing it to the top (or bottom) of the tank. A cover plate 53 for the tube is secured to the collar 51 and fits within the ring. Extending inwardly from the plate 53 is an electrical conductor rod 54, and secured to the plate is an insulating block 55 in which a resistance bar 56 is supported parallel with the rod 54.

Within the tube 48 and slidable on the conductor rod 54 and resistance bar 56 is a magnetic follower 57 in the form of a ring, which is moved by the magnetic attractive force of the magnet 46 as it rises and falls due to the change in liquid level. Contact with the rod and bar is insured by inserting the rod 54 through a bore 58 in the follower 57, by providing contact balls 59 in recesses 60 at one side of the bore, and by seating a contact ball 61 in a transverse bore 62 at the opposite side of the follower and holding it yieldingly against the bar 56 by means of a spring 63 in the bore 62 bearing against the ball at one end and against a screw head 64 threaded into the bore from the outer end thereof.

A slight engagement is always maintained with both the rod 54 and the bar 56 by the contact balls to insure an electrical connection, to maintain the follower yieldingly in place, and to prevent binding, wedging, or chattering. Change in the position of the magnet 46 will cause a corresponding change in the position of the follower.

Attached to the outer side of the cover plate 53 is an insulating plate 65 through which extends a contact post 66 in electrical connection with the bar 54 also secured to plate 53. If the cover plate 53 is of insulating material a separate conductor extends from bar 54 to the contact post 66. Another contact post 67 extends through an opening 68 in plate 53 and is mounted in the insulating block 55 in contact with the resistance bar 56. A threaded shell 69 may be attached to the outside of plate 65 and surrounding the contact posts 66 and 67 for protecting them and providing means for attachment of a cover cap.

To utilize this magnetic gauge, a battery or other source of power and an indicating electrical instrument may be electrically connected to the posts 66 and 67, as illustrated in Fig. 3 in connection with the posts 42 and 44. The height or amount of liquid in a tank may thus be indicated by a remote indicator.

In this invention the movement of a permanent magnet due to a change in pressure or the change in height of a liquid causes a corresponding movement of a follower magnet which may be visibly observed or may cause a change in resistance which in turn may cause a variation of an electrical indicating instrument. By graduating the instrument, variations in movement of the follower magnet may be read as pounds of pressure or inches (or proportions) in height of liquid in a tank.

The invention described herein may be manufactured and used by or for the Government of the United States of America, for governmental purposes without the payment of any royalties thereon or therefor.

I claim:

1. A gauge comprising a permanent magnet, means providing a closed bore for receiving fluid pressure with a piston movable therein to which the magnet is attached, a spring in the bore to move the piston against the pressure, a magnetic follower in the magnetic field of the magnet and movable directly in the same direction therewith, non-magnetic compartment means to confine the follower in a path parallel to the movement of the magnet, and means to indicate the relative position of the follower in its path.

2. A gauge comprising a magnet floatable in a liquid whose level is to be indicated and a movable magnetic follower in the field of the magnet housed in a liquid-tight container having walls made of a nonmagnetic material for separating said floatable magnet from said follower, means mounting the magnet for vertical movement due to a change in liquid level, means for mounting the follower to move directly with the magnet in the same direction, a resistance bar engaged by the follower, and electrical indicating means connected to the bar and variable as the follower moves on the bar to show the relative position for the follower and the corresponding position of the magnet.

3. A gauge comprising a magnet floatable in a liquid whose level is to be indicated and a magnetic follower housed in a liquid-tight container having walls made of a nonmagnetic material separating said floatable magnet from said follower, means mounting the magnet for vertical movement due to change in liquid level, means for mounting the follower in the field of and to move directly with the magnet in the same direction, a resistance bar engaged by the follower in its movement, and electrical indicating means connected to the resistance bar and variable as the resistance is varied by movement of the follower on the bar to show the relative position of the follower and the corresponding liquid level applied to the magnet.

4. A liquid level gauge comprising a magnet, a float in which the magnet is contained, a magnetic follower, a hollow shell for containing the follower and separating it from the liquid, means within the shell for slidably guiding the follower in the field of the magnet, the magnet being movable at the outside of the shell, a resistance bar in the shell and a contact on the follower for engaging it, and electrical indicating means connected to the resistance bar and varied by the change of the resistance as the follower moves up and down in accordance with the movement of magnet and float.

5. A liquid level gauge insertable in a tank, comprising a hollow shell container submergible at its closed end in the liquid, a float ring surrounding the shell, a permanent magnet in the float ring, a magnetic follower in the field of the magnet within the shell and movable directly with the magnet to the same extent, a removable cap for the shell, a guide rod for the follower secured to the cap, a resistance bar contacted by the follower, and electrical indicating means connected through the bar, rod and follower to indicate a variation of resistance as the follower moves in accordance with the movement of the magnet.

6. A liquid level gauge insertable in a liquid container comprising a hollow shell closed at its inner end, a cap at the outer end with a flange fitting the container, a float ring no larger than the flange freely movable on the outside of the shell, a magnet in the ring, a follower inside of the shell in the field of the magnet, a conductor rod and a resistance bar supported by the cap in the shell and engaged as a guide by the follower, insulated contact posts at the outside of the cap electrically connected to the rod and bar respectively, and electrical indicating means connected to the contact posts.

7. In a liquid level gauge, a non-magnetic hollow shell closed at its inner end inserted into a liquid container, a hollow float surrounding and movable freely along the shell, a magnet within the float, a magnetic follower movable freely within the shell to the same extent as the magnet, and means for guiding the follower lengthwise in the shell and parallel to the movement of the magnet in the influence of its magnetic field, indicating means connected to said magnetic follower and responsive to the movement thereof for providing an indication of liquid level at an accessible point.

8. In a liquid level gauge, a non-magnetic shell closed at its inner end and adapted to be inserted at the top or bottom within a liquid container, a hollow float surrounding and movable along the shell, a magnet within the float, a magnetic follower freely movable in the shell in the same direction and to the same extent as the magnet, guide means for the follower extending into the shell, and contact balls seated in the follower and engaging the guide means to maintain contact therewith and to prevent the follower from wedging and sticking, indicating means responsive to the movement of said magnetic follower for providing a liquid level indication at an accessible point.

9. A liquid level gauge comprising an elongated tube adapted to be suspended in a liquid storage tank, a pair of elongated conductive elements mounted within the tube parallel to the longitudinal axis thereof, a contacting element disposed in the tube and free to travel therein in contact with the pair of conductive elements, current indicating means connected in series with said source of voltage, a float adapted to float on the liquid in said storage tank and to remain in proximity to said tube, a magnet disposed in the float, the magnet serving to fix the location of the contacting element in the tube so that the contacting element moves in a direction and for a distance corresponding to the movement of the float.

10. A magnetic gauge for indicating a fluid characteristic comprising first means including a magnetic member located in contact with the fluid to be measured, said magnetic member movable with the variation of the characteristic to be indicated, a magnetic follower in the field of the magnetic member, a housing for said magnetic follower having walls made of a nonmagnetic material for providing a fluid-tight separation between said first means in contact with the fluid to be measured and said magnetic member, a variable electrical impedance element in said housing, means coupling said movable magnetic follower to said variable impedance element for varying same in response to movement of said magnetic member, impedance indicating means connected to said variable impedance to indicate the value of said impedance whereby the value of fluid characteristic is remotely indicated.

11. A magnetic gauge for indicating a fluid characteristic comprising first means including a magnetic member located in contact with the fluid to be measured, said magnetic member movable with the variation of the characteristic to be indicated, a magnetic follower in the field of the magnetic member, a housing for said magnetic follower having walls made of a nonmagnetic material for providing a fluid-tight separation between the said first means in contact with the fluid to be measured and said magnetic member, a variable electrical impedance element in said housing, means coupling said movable magnetic follower to said variable impedance element for varying same in response to movement of said magnetic member, terminal means electrically coupled to said variable impedance for connection with an impedance indicating means for providing a remote indication of said fluid characteristics.

LORNE E. ROUX.

REFERENCES CITED

The following references are of record in the file of this patent:

UNITED STATES PATENTS

| Number | Name | Date |
| --- | --- | --- |
| 530,592 | Kleritj | Dec. 11, 1894 |
| 995,414 | Nault | June 13, 1911 |
| 1,594,808 | Anderson | Aug. 3, 1926 |
| 1,610,591 | Redman | Dec. 14, 1926 |
| 2,339,922 | Gatewood | Jan. 25, 1944 |
| 2,484,690 | De Giers | Oct. 11, 1949 |

FOREIGN PATENTS

| Number | Country | Date |
| --- | --- | --- |
| 269,782 | Great Britain | Apr. 28, 1927 |
| 600,546 | France | Feb. 9, 1926 |
| 864,647 | France | May 1, 1941 |